Nov. 18, 1958 J. P. FIORE ET AL 2,861,206

COLOR IMAGE REPRODUCERS

Filed Dec. 29, 1955 3 Sheets-Sheet 1

JOSEPH P. FIORE
CONSTANTIN S. SZEGHO
*INVENTORS.*

BY John J. Pederson
THEIR ATTORNEY.

Nov. 18, 1958 J. P. FIORE ET AL 2,861,206

COLOR IMAGE REPRODUCERS

Filed Dec. 29, 1955 3 Sheets-Sheet 2

JOSEPH P. FIORE
CONSTANTIN S. SZEGHO
*INVENTORS.*

BY John J. Pederson

THEIR ATTORNEY.

COLOR IMAGE REPRODUCERS

Filed Dec. 29, 1955 3 Sheets-Sheet 3

JOSEPH P. FIORE
CONSTANTIN S. SZEGHO
*INVENTORS.*

BY John J. Pederson

THEIR ATTORNEY.

United States Patent Office 2,861,206

Patented Nov. 18, 1958

2,861,206

COLOR IMAGE REPRODUCERS

Joseph P. Fiore and Constantin S. Szegho, Chicago, Ill., assignors to Zenith Radio Corporation, a corporation of Delaware Application December 29, 1955, Serial No. 556,185

13 Claims. (Cl. 313—65)

This invention is directed to new and improved image screen structures for color image reproducers and to color television image reproducers utilizing such target structures.

One of the principal disadvantages associated with color television image reproducing devices in current commercial use is the necessity for accurate convergence of a plurality of electron beams in the region of the image reproducer target structure. A number of image reproducers which do not require convergence of plural beams have been proposed in the past; however, these picture tubes also present difficult problems with respect to accurate control of the color values in the reproduced image. In fact, it appears that color registration and desaturation difficulties will continue to represent one of the principal problems in all image reproducers which follow the conventional practice of directly exciting luminescent material by means of one or more electron beams.

There have also been some proposals for construction of image reproducers which utilize electroluminescent materials in their target structures. These materials, which are relatively new in this field of use, are caused to emit light by establishing an electrical field across the material instead of utilizing electron bombardment for this purpose. These proposed image reproducers, in general, are difficult to scan in accordance with the requirements of television reproduction techniques and are also difficult to modulate in order to obtain varying luminance values in the reproduced image.

It is an object of the invention, therefore, to provide a new and improved image screen structure for a color image reproducer in which registration and convergence difficulties are effectively eliminated.

It is another object of the invention to provide an image screen structure for a color image reproducer which utilizes electroluminescent effects in reproducing an image in color.

It is a further object of the invention to provide an electroluminescent color target structure in which scanning and modulation are effected by relatively simple apparatus.

It is an additional object of the invention to provide a new and improved image screen structure suitable for use as a color adapter in conjunction with a monochrome television reproducer.

It is another object of the invention to provide a new and improved image screen structure for a color image reproducer which may be controlled in part by a single electron gun without presenting undue difficulty in registration of colored portions of a reproduced image.

It is a corollary object of the invention to provide a dark-trace image screen structure for a color image reproducer.

Yet another object of the invention is to provide a new and improved image screen structure, utilizing electroluminescent materials, which may be utilized to perform some of the color matrix functions of a color television receiver.

An image screen structure for a color image reproducer constructed in accordance with the invention comprises a first target element group including a multiplicity of individual target elements; each of these target elements comprises an electroluminescent material which effectively emits light of a first primary color when excited by an electrical field within a predetermined intensity range and a semiconductive material which varies in conductivity when subjected to corpuscular-energy bombardment. For the purposes of this application, corpuscular energy is defined as including light within the visible and invisible spectra as well as electrical energy such as a beam of electrons. The electroluminescent material may itself emit light restricted to the desired first primary color or, alternatively, a filter material may be utilized to select the desired primary color from light emitted within a spectral range substantially broader than the desired primary. The image screen structure further includes a second target element group comprising a multiplicity of individual target elements interspersed with the first group of target elements in a predetermined geometrical pattern throughout an image screen area, which area may represent a substantial portion of the faceplate area of a cathode-ray picture tube. Each of the target elements of this second group is structurally similar to those of the first group and comprises an electroluminescent material which, when excited, effectively emits light of a second primary color. In addition, the screen structure comprises electrical connector means for establishing separately controllable electrical fields across the two groups of target elements; this connector means comprises a pair of electrically conductive elements in contact with respective surfaces of the target element groups. Preferably, the conductive elements of the connector means comprise light-transparent electrically conductive coatings which are in contact with the target elements.

The features of the invention which are believed to be new are set forth with particularity in the appended claims. The invention, together with further objects and advantages thereof, may best be understood, however, by reference to the following description taken in conjunction with the accompanying drawings, in which:

Figures 1, 2:
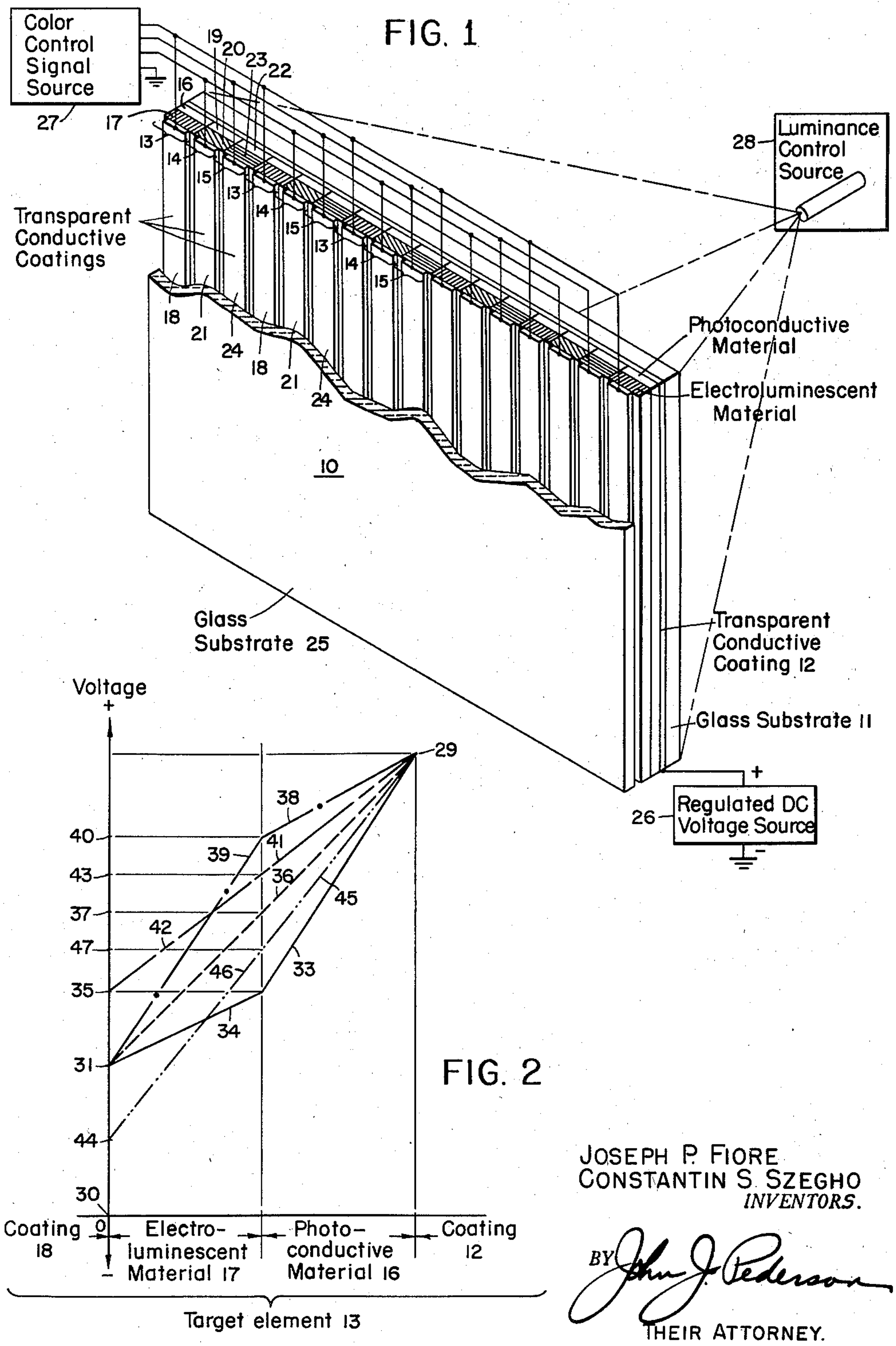
Figure 1 is a partially sectionalized perspective view of an image screen structure constructed in accordance with one embodiment of the invention and includes a schematic representation of auxiliary devices which may be employed in conjunction with the image screen structure.
Figure 2 is a graph illustrating certain operating characteristics of the image screen structure of Figure 1.

The image screen structure 10 illustrated in Figure 1 comprises a first support member 11 preferably formed from glass or other suitable transparent material; substrate 11 is covered on one surface with a thin transparent electrically conductive coating 12. Coating 12 may, for example, comprise a thin transparent coating of tin oxide deposited upon the glass support member by the process conventionally known as iridizing. Image screen structure 10 further includes three different groups 13, 14 and 15 of color target elements interspersed with each other in a predetermined geometrical pattern throughout the image screen area of support member 11. Each of the target elements of group 13 comprises a discrete layer 16 of a semiconductive material which varies in conductivity when subjected to corpuscular-energy bombardment. In the particular structure illustrated, the semiconductive material of layer 16 comprises a photoconductive material, such as cadmium sulfide, which may be excited by light energy.

The target elements of group 13 each further include a layer 17 of electroluminescent material which effectively emits lights of a first primary color when excited by an electrical field of a strength exceeding a predetermined threshold intensity. Electroluminescent layer 17 is in electrical contact with photo-conductive layer 16, the opposite side of the photo-conductive layer being in electrical contact with transparent coating 12. In the illustrated embodiment, electroluminescent material which emits light corresponding to the primary color blue is utilized in each of the layers 17 of the target elements in group 13. Each of these target elements of the first group is also in contact with a connector element formed by a series of electrically interconnected light-transparent conductive coatings 18.

The target elements of the second group 14 are structurally similar to those of group 13. Each of target elements 14 comprises a photoconductive layer 19 deposited upon transparent coating 12 and a layer 20 of electroluminescent material which is in contact with photoconductive layer 19. A second connector element comprising a series of transparent conductive coatings 21 interconnects the target elements of group 14. Color target element group 15 is also similar in construction to target element group 13; each of the target elements of group 15 comprises a photoconductive layer 22, an electroluminescent layer 23, and a connector comprising a series of transparent conductive coatings 24. The three conductive elements comprising coatings 18, 21 and 24, which contact respective surfaces of target element groups 13, 14, and 15, together with conductive coating 12, comprise electrical connector means permitting separate control of electrical fields across the three groups of target elements. The target elements of groups 14 and 15 are differentiated from those of group 13 and from each other by the use of electroluminescent materials which effectively emit light of different primary colors. For example, electroluminescent layers 19 of the target elements of group 14 may emit light corresponding to green as a primary color, whereas electroluminescent layers 23 of target group 15 may emit light corresponding to red as a primary color. Electroluminescent materials which emit red, green and blue light have been described in the article "Copper Activated Zinc Sulphide Phosphors With Yellow and Red Emission" by H. C. Froelich, Journal of the Electrochemical Society, June 1953, pp. 280–288 and "Electroluminescent Zinc Sulphide Phosphors" by H. H. Homer et al., in the same Journal, December 1953, pp. 566–571. Other electroluminescent materials may also be utilized without departing in any way from the invention. The target elements are protected by a second glass support member 25 which covers transparent conductive coatings 18, 21 and 24.

Transparent conductive coating 12 is connected to a source of unidirectional operating potential 26; preferably, D. C. source 26 comprises a regulated voltage supply, for reasons which will be made apparent hereinafter. In the illustrated embodiment, the conductive coating is connected to the positive terminal of potential source 26 and the negative terminal is grounded, but the polarities may be reversed if desired. The electrical connector element comprising conductive coatings 18 is connected to a source of color control signals 27; the two additional electrical connector elements comprising interconnected coatings 21 and the other group of interconnected coatings 24 are also individually electrically coupled to color control source 27. The illustrated image reproducer also includes a luminance control source 28 which may comprise a projection-type television image reproducer; alternatively, luminance control source 28 may comprise a conventional television picture tube or any other suitable source for illuminating the image screen structure with light in accordance with the luminance values of an image to be reproduced.

Operation of the color image reproducer illustrated in Figure 1 can best be understood by reference to Figure 2, in which the voltage gradients or electrical fields across an individual target element are plotted for various operating conditions. In this graph, the axis of abscissas represents a cross section of an individual target element, one of the target elements of group 13 having been selected for convenience. The ordinates of the graph comprise potential levels.

Conductive coating 12 is maintained at a predetermined reference potential 29 with respect to a selected datum plane 30, which, in the given example, represents ground potential. Potential level 29 should be maintained constant for best operation of the image screen structure; for this reason, it is preferable that the D. C. voltage source 26 connected to coating 12 (Figure 1) be of the regulated type. The connector element comprising coating 18 is established at a reference potential 31 determined by color control source 27 (Figure 1). Under these conditions, with no light impinging upon photoconductive material 16, the voltage gradients or electrical fields across the two layers 16 and 17 are determined by the conductivity of the two layers and may, for example, be as illustrated by solid lines 33, 34 in the graph. Under these conditions, the electrical field across electroluminescent material 17 is represented by the voltage between ordinates 35 and 31 in the graph; this potential difference is established by appropriate proportioning of the thicknesses of the component layers and selection of materials below the emission threshold of the electroluminescent material employed so that substantially no light output is generated. Consequently, the screen is normally dark in appearance.

Photoconductive material 16 may be bombarded with light of given intensity, thereby substantially increasing its conductivity and changing the voltage distribution across the two layers 16 and 17 to that represented by dash line 36. Under these operating conditions, the electrical field across electroluminescent layer 17 is represented by the potential difference between ordinates 37 and 31; this potential difference may be above the threshold level of the electroluminescent material and may cause emission of a relatively small amount of light therefrom. The light output may be increased by subjecting photoconductive material 16 to a higher level of illumination, thereby further increasing the conductivity of the photoconductive layer and altering the voltage distribution across the two layers to that illustrated by lines 38 and 39. Under these operating conditions the electrical field across electroluminescent material 17 is represented by the potential difference between the ordinates 31 and 40, providing a substantially increased light output.

It is thus apparent that the intensity of luminescence of the target elements of group 13 may be varied in accordance with irradiation of photo-conductive material 16 by light from luminance control source 28 of Figure 1. The potential level of coating 18 may also be varied directly to modulate the light output from electroluminescent material 17. For example, the potential level of coating 18 may be varied from the value represented by ordinate 31 to that represented by ordinate 35. At the same time, photo-conductive material 16 may be irradiated by light to the same extent required to produce the voltage distribution curve 36. Under these conditions, the voltage distribution within the two layers is represented by curves 41 and 42 and the electrical field across the electroluminescent material is represented by the potential difference between the ordinates 43 and 35. This may provide some light output, although substantially less than in either of the two previously mentioned examples. On the other hand, the operating potential of coating 18 may be dropped to the point represented by ordinate 44, in which case, with the same irradiation of photo-conductive material as in the case of voltage distribution curve 36, the voltages across the two layers are represented by lines 45 and 46. It will be seen that this change in the operating potential of the connector element comprising coating 18 produces a voltage gradient across the electroluminescent material as indicated by the potential difference between ordinates 44 and 47 and provides a substantially increased light output.

In the light of the foregoing explanation of operation of a single target element in image screen structure 10, the overall operation of the color image reproducer illustrated in Figure 1 is readily understandable. The photoconductive material comprising target layers 16, 19 and 22 is bombarded with light from luminance control source 28 in accordance with the luminance values of the image to be reproduced. As mentioned above, source 28 may comprise a projection-type television image reproducer or any other suitable source of light which may be controlled to provide the desired modulated bombardment of the photoconductive material. At the same time, the light output from individual target elements of groups 13, 14 and 15 is subjected to further control by varying the potentials on the electrical connector means comprising conductive coatings 18, 21 and 24 in response to suitable signals supplied from control source 27.

As a broad example, a given scene may be intended to be reproduced in only the blue primary color. To achieve this result, color control source 27 is actuated to apply a relatively high positive operating potential to the connector elements comprising coatings 21 and 24; at the same time, the operating potential applied to the connector element comprising coatings 18 is made substantially lower. Under these conditions, the target elements 13 produce a definite light output in response to variations in conductivity of photo-conductive layers 16 under the control of luminance source 28. The potential difference across electroluminescent layers 20 and 23 of target element groups 14 and 15, on the other hand, is insufficient to provide any light output from these target elements, so that the image is reproduced entirely in blue. It will be immediately apparent to those skilled in the art that the color content of the reproduced image may be varied in conventional sequential manner by application of proper color control signals to the segmented conductive coatings 18, 21 and 24. On the other hand, simultaneous-type color control signals may be applied to the connector elements if desired. Image screen structure 10 may be utilized as a color adapter in conjunction with a conventional monochrome television receiver, since excitation of the photoconductive material may be effected by the light output of the picture tube of such a receiver. On the other hand, the image reproducer may be utilized with the illustrated projection source or any other variable light source for television or other color image displays.

Figure 3:
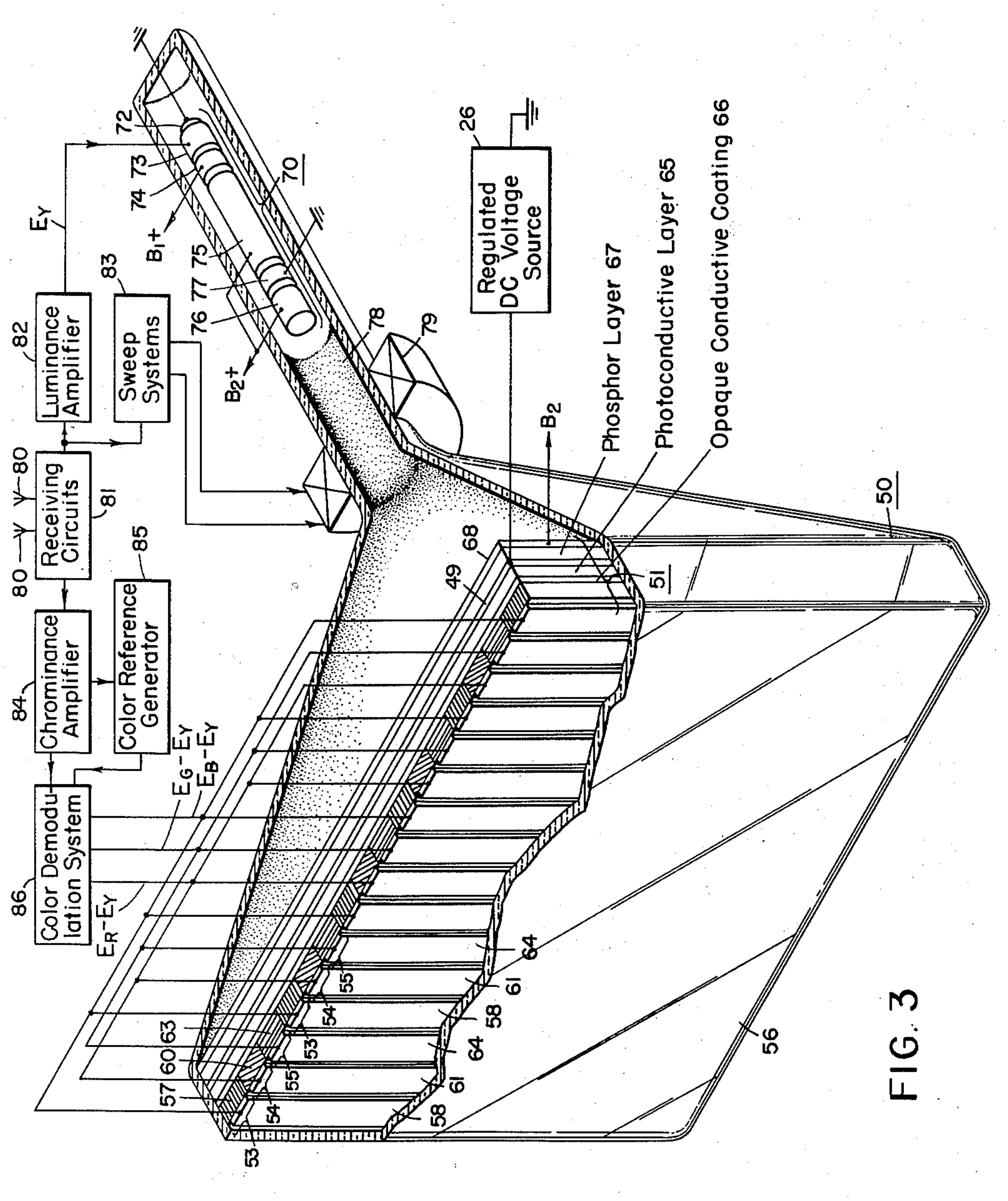
Figure 3 is a sectionalized perspective view of a cathode-ray tube image reproducer constructed in accordance with the invention; this view also shows, in simplified schematic form, the circuitry for a color television receiver in which the image reproducer may be incorporated.

Figure 3 illustrates a color television receiver comprising a color image reproducer 50 including an image screen or target structure 51 which is in many respects similar to structure 10 of Figure 1. Target structure 51 comprises three groups 53, 54 and 55 of color target elements which are substantially similar to the target element groups 13, 14 and 15 of the previously described embodiment. Thus, the "blue" target elements of group 53 each comprise a light-transparent conductive coating 58 deposited upon the internal surface of the faceplate 56 of cathode-ray tube 50; conductive coating 58 in each element is in direct electrical contact with a layer 57 of electroluminescent material which, when excited by an electric field of adequate strength, effectively emits light corresponding to blue as a primary color. Conductive coatings 58 are all electrically interconnected to form a single connector element common to the target elements of group 53. The target elements of group 54 are of similar construction and each comprise a layer of electroluminescent material 60 separated from the internal surface of faceplate 56 by individual portions of a connector element comprising a series of transparent conductive coatings 61. The target elements of group 55 each include a layer 63 of electroluminescent material and a transparent conductive coating 64; the target elements of groups 54 and 55 are utilized to generate green and red light respectively.

In this embodiment, however, the photo-conductive material utilized to control luminance values in the reproduced image is not sectionalized as in image screen structure 10 of Figure 1; rather, a continuous layer 65 of photo-conductive material extends across the entire image screen area. Photo-conductive layer 65 is electrically connected to electroluminescent layers 57, 60 and 63 by an opaque electrically conductive coating 66. Coating 66, which may comprise colloidal graphite or other opaque electrically conductive material suitable for use in a vacuum tube, is utilized to preclude feedback of light energy from the electroluminescent layers to the photoconductive material to avoid "blooming" and other saturation effects in the reproduced image. As in the previous embodiment, photo-conductive layer 65 is backed by a light-transparent electrically conductive coating 49. On the side of conductive layer 49 opposite the photo-conductive material of layer 65, there is provided a layer 67 of conventional luminescent material which emits light when subjected to the electron bombardment. Generally speaking, the phosphor selected for luminescent layer 67 should be one which, when excited, emits light having the necessary spectral characteristics to vary the conductivity of the material comprising photo-conductive layer 65. Phosphor layer 67 is provided with a conductive film 68, which may be formed of aluminum or other suitable material in accordance with the usual practice.

The remainder of picture tube 50 is generally conventional in construction and may, for example, comprise an electron gun 70 disposed within the neck section 71 of the tube envelope. Electron gun 70 may comprise a cathode 72, a control electrode 73, and accelerating electrode 74, and a pair of focus anodes 75 and 76 separated by a focusing or lens electrode 77. It will be recognized that the illustrated electron gun is a conventional electrostatically focused type; any other suitable gun structure may be substituted for electron gun 70 without departing in any way from the invention. In the illustrated apparatus, cathode 72 is grounded, accelerator 74 is connected to a first source of positive operating potential $B_1+$, and anodes 75 and 76 are connected to a substantially higher operating potential source $B_2+$, lens electrode 77 being grounded.

The picture tube is also provided with the usual conductive coating 78 extending from electron gun 70 up to the region adjacent target structure 51; conductive coating 78 may be formed from colloidal graphite or may comprise a relatively thin coating of a metal such as aluminum on the inner surface of the envelope wall. In the illustrated embodiment, conductive coating 78 is electrically connected to conductive coating 68 of the target structure and to final anode voltage source $B_2+$. Picture tube 50 is also provided with the usual scanning-deflection system, illustrated schematically in the drawing as an electromagnetic scanning yoke 79.

Figure 3 also shows, in greatly simplified schematic form, a circuit arrangement which may be employed in a color television receiver in conjunction with image reproducer 50. This circuit comprises an antenna 80 connected to a receiving circuit unit 81 which may include the usual radio-frequency amplifier, first detector, intermediate-frequency amplifier, and second detector stages of a television receiver. The output stage of receiving circuits 81 is coupled to a luminance amplifier 82, which in turn, is coupled to control electrode 73 of electron gun 70. The receiving circuit unit is also coupled to the sweep systems 83 of the receiver, sweep systems 83 being connected to the horizontal and vertical deflection coils of deflection yoke 79. Receiving circuits 81 are further coupled to a chrominance amplifier 84. Chrominance amplifier 84 is coupled to a color reference generator 85 and to a color demodulating system 86; the output stage of color reference generator 85 is also coupled to demodulating system 86. Demodulating system 86, in turn, is individually coupled to the three connector elements comprising conductive coating series 58, 61 and 64 of image screen structure 51. Demodulating system 86 comprises the color control source for the embodiment of the invention.

Operation of the color television circuits illustrated in Figure 3 is completely conventional; consequently, only a brief description will be presented here. A color telecast is intercepted at antenna 80 and is amplified and detected in receiving circuits 81 to develop a composite color signal including the requisite synchronizing, luminance, and chrominance information. That portion of the composite color signal generally representative of luminance values in the image to be reproduced is amplified in amplifier 82 and applied to control electrode 73 to modulate the intensity of the electron beam generated by gun 70. The electron beam is caused to scan image screen structure 51 in the usual manner by sweep signals applied to deflection yoke 79 from sweep systems 83. The chrominance and color-synchronizing components of the composite color signal are amplified in amplifier 84. The chrominance signal is applied to color demodulating system 86 and the color-synchronizing signal is supplied to color reference generator 85, which generates a color reference signal locked in phase and frequency to the received color-synchronizing signal. This color reference signal is also applied to demodulating system 86 and is utilized therein to demodulate the chrominance signal in conventional manner to develop three color difference signals $E_R—E_Y$, $E_G—E_Y$, and $E_B—E_Y$. These three color difference signals are applied to the electrical connectors comprising conductive coatings 58, 61 and 64 respectively.

As in the previous embodiment, a regulated D. C. voltage source 26 is connected to conductive layer 49 of image screen structure 51 to establish a potential difference across each of the target elements of the screen structure. A portion of this potential difference, of course, appears across photo-conductive layer 65 and the remainder of the voltage appears across electroluminescent layers 57, 60 and 63. Luminance values in the reproduced image are controlled by the electron beam from gun 70, which scans the target in the usual manner and which is modulated in intensity by the luminance signal $E_Y$ applied to control electrode 73. The electron beam produces on phosphor layer 67 an image representative of the luminance values of the image to be reproduced; light from the phosphor layer in turn varies the local conductivity of photo-conductive layer 65 in the manner described above in connection with Figures 1 and 2. Generally speaking, the lateral conductivity of semiconductive layer 65 is quite low, so that it is not essential that this layer be segmented as in the previously described embodiment.

The color difference signals applied to conductive coatings 58, 61 and 64 control the color values in the reproduced image. Thus, each of the blue-light-emissive target elements of group 53 is excited by an electric field or voltage determined by the combined effect of control signal $E_B—E_Y$ applied to conductive coatings 58 and the luminance signal $E_Y$ used to modulate the electron stream from gun 70. Similarly, the target elements of group 54 reproduce the green portions of the image under the conjoint control of the color difference signal $E_G—E_Y$ applied to coatings 61 and the luminance signal used to vary the electron beam intensity; the target elements of group 55 produce red light, the intensity of which is conjointly controlled by the electron beam from gun 70 and the red color difference signal applied to the electrical connector comprising coatings 64. Thus, image screen structure 51 effectively combines the functions of an image screen and a matrix unit; consequently, it is not necessary to utilize separate circuit elements to develop primary color signals of the form $E_R$, $E_G$ and $E_B$ to drive the picture tube. No gating control is necessary for target structure 51, which reproduces the color image in simultaneous manner. No registration difficulties are presented, since the color content of the image is directly controlled by signals applied to the target elements themselves. There is no critical relationship between the alignment of electron gun 70 and the target electrode established by image screen structure 51, nor does color reproduction depend upon accurate convergence of a plurality of electron beams.

Figure 4:
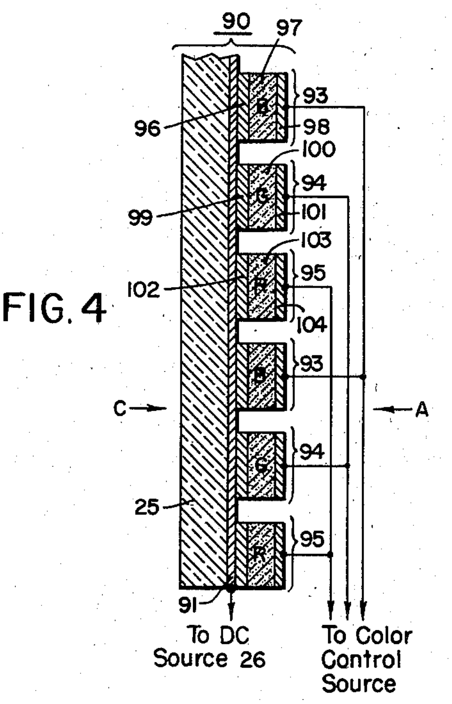
Figure 4 is a cross-sectional view, greatly enlarged, of a portion of another embodiment of the inventive image screen structure.

Figure 4 illustrates another embodiment of the invention; it comprises an image screen structure 90 including a glass or other transparent substrate 25, one surface of which is coated with a transparent electrically conductive coating 91 preferably formed by iridizing or similar process. Image screen structure 90 further includes three groups 93, 94 and 95 of transparent elements interspersed with each other in a predetermined geometric pattern throughout the image screen area. The target elements of group 93 each comprise a layer 96 of highly resistive light-transparent material such as a conductive glass deposited in electrical contact with conductive coating 91 and a layer 97 of electroluminescent semi-conductive material deposited upon the opposite side of resistive layer 96 from the conductive coating. The semi-conductive material used in layer 97 is of the type which exhibits bombardment-induced conductivity; that is, it comprises a material which, when subjected to bombardment by electrons or other charge particles, exhibits a marked increase in conductivity. Such materials are known in the art and are usually designated as BIC materials; for example, these characteristics are exhibited by antimony trisulphide and arsenic trisulphide. The semi-conductive material is preferably mixed with an electroluminescent material which emits blue light when excited by an electrical field of adequate strength. The target elements of group 93 further include an electron-transparent conductive coating 98 deposited upon the surface of layer 97 opposite resistive coating 96.

The target elements of group 94 are essentially similar in structure to those of group 93; the target elements of this second group each comprise a layer 99 of resistive material upon which is deposited a layer 100; layer 100 comprises a mixture of an electroluminescent material which emits green light when suitably excited and one of the aforementioned materials which exhibits bombardment-induced conductivity. Each of the target elements of group 94 further includes an electron-permeable conductive coating 101. The target elements of group 95 are of similar construction, each comprising a resistive layer 102, a red-light-emissive layer 103 of electroluminescent and semi-conductive material, and a transparent conductive coating 104. Conductive coatings 98 of target element group 93 are all electrically interconnected and are coupled to a color control source such as device 27 of Figure 1 or color demodulating system 86 of Figure 3. Similarly, the individual conductive coatings 101 of the target elements of group 94 are electrically connected to each other and to the color control signal source; conductive coatings 104 are similarly interconnected to form a single connector element which is utilized to couple the target elements of group 95 to the color control source. In this embodiment of the invention, the light-transparent conductive coating 91 is connected to a source of operating potential such as regulated D. C. voltage source 26 (Figures 1 and 3).

For operation, target structure 90 is mounted in a cathode-ray tube such as tube 50 of Figure 3 and may be connected to television receiver circuitry in the manner indicated in that figure; the image screen structure is subjected to electron bombardment from the direction indicated by arrow A and the image reproduced is viewed as indicated by arrow C. In this image screen structure, as contrasted with those previously described, the initial potential difference established across each of the target elements by means of the connections to D. C. source 26 and the color control source is made great enough to cause the electroluminescent materials in target element layers 97, 100, and 103 to emit the maximum desired light. Consequently, in the absence of any color control signal variations and with no electron bombardment, the image screen structure presents a substantially uniform illuminated image screen area. Bombardment of the image screen structure with a stream of electrons is employed to reduce the conductivity of layers 97, 100, and 103 in desired portions of the image screen area; the reduction in conductivity causes a corresponding reduction in the voltage gradient across the electroluminescent material of these layers and substantially reduces the light output. This effect, as in the previous embodiments, may be counteracted or aided by color control signals applied to the target element groups to effect color selection. Image screen structure 90 thus provides for a dark-trace type of color reproduction in which the image is developed by reducing light output from the screen structure instead of increasing it.

Target structure 90 is not restricted to the use of a continuous conductive film on the side of the target elements adjacent substrate 25 and a segmented series of conductive films on the side of the target structure subjected to electron bombardment; rather, an arrangement corresponding to those illustrated in conjunction with image screen structures 10 and 51 may be employed in which the conductive film on the viewing side of the target elements is segmented, in which case a continuous conductive film may be employed on the electron-gun side of the target structure. Moreover, the conductive coating arrangement illustrated in Figure 4 may be utilized in the target structures of Figures 1 and 3 to equal advantage, and, in any of the target structures thus far described, the conductive films on both sides of the individual target element groups may be segmented if desired.

Figure 5:
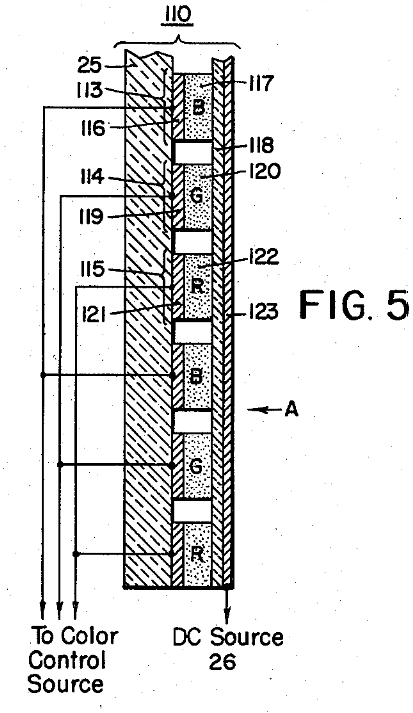
Figure 5 is a partial cross-sectional view of a further embodiment of the invention.

Figure 5 illustrates another image screen structure 110 suitable for use as the target in a cathode-ray color image reproducer. Target structure 110 comprises the usual transparent substrate 25, which may constitute the faceplate of a cathode-ray tube envelope. The image screen structure further includes three groups 113, 114, and 115 of color target elements which are generally similar in structure to each other. The target elements of group 113 each comprises a transparent conductive film 116 and a layer 117 of electroluminescent material which, when excited, emits blue light; the target elements of this first group further include a relatively thin coating 118 of material which exhibits bombardment-induced conductivity, such as the materials set forth above in connection with Figure 4. The target elements of group 114 each comprise a transparent conductive coating 119 and a green-light-emissive layer 120 of electroluminescent material; similarly, the target elements of group 115 each include a transparent conductive coating 121 and a red-light-emissive layer 122 of electroluminescent material. Layer 118 of the BIC semi-conductor is common to all of the target elements in structure 110 and is backed by a thin electron-permeable conductive coating 123. The individual conductive coatings 116 of target element group 113 are all electrically interconnected and are coupled to a suitable color control source such as units 27 and 86 of Figures 1 and 3 respectively. Similarly, conductive coatings 119 of target element group 114 are all electrically interconnected and are coupled to the color control source; coatings 121 of the target elements of group 115 are also electrically interconnected to form a single connector element which is coupled to the color control source. Conductive coating 123 is connected to a suitable source of operating potential such as the regulated voltage source 26 of Figures 1 and 3.

In operation, image screen structure 110 is essentially similar to target structure 51 of Figure 3. Luminance values in the image to be reproduced are controlled by scanning the image screen structure with a modulated beam of electrons from the direction generally indicated by arrow A. The electron beam, impinging upon BIC layer 118, selectively reduces the resistivity of the semi-conductive layer and thereby increases the voltage gradient across electroluminescent layers 117, 120, and 122. Thus, the electron beam controls luminance values in the reproduced image in essentially the same manner as in tube 50 of Figure 3. Simultaneously, color content in the reproduced image is controlled by suitable signals applied to the individual target element groups to counteract or aid the effect of the luminance control provided by the electron beam.

Figure 6:
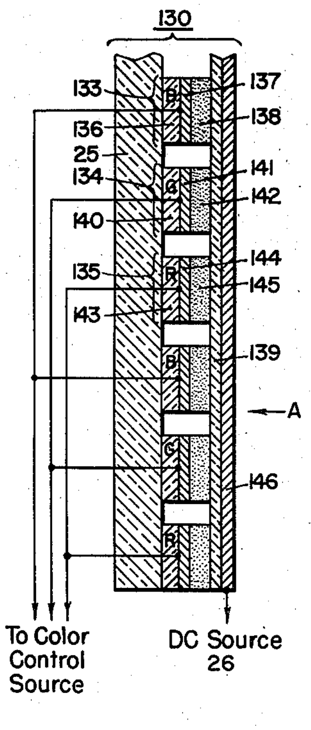
Figure 6 illustrates, in partial cross-section, another image screen structure constructed in accordance with the invention.

Figure 6 shows, in greatly enlarged cross-sectional view, a portion of an image screen structure 130 comprising a further embodiment of the invention. Image screen structure 130, like the previously described structures 51, 90, and 110 of Figures 3, 4, and 5 respectively, is intended for use as a target in a cathode-ray image reproducer. The image screen structure comprises a suitable transparent substrate 25, which may comprise the faceplate of a cathode-ray tube envelope, and three distinct groups 133, 134, and 135 of target elements supported on the substrate.

Each of the target elements of group 133 comprises a relatively thin layer 136 of color filter material which readily transmits light corresponding to the desired blue primary color but substantially attenuates light in the remainder of the visible spectrum. Each of the target elements of this group further comprises a thin light-transparent electrically conductive film 137 superimposed upon the color filter material and a layer 138 of electroluminescent material. In this embodiment, it is not necessary that the electroluminescent material emit light restricted to only one color, so long as it does emit an adequate amount of light in the blue portion of the spectrum, since only blue light is transmitted through color filter layers 136. The individual target elements of group 133 further include a relatively thin layer 139 of a semi-conductive material which, when subjected to electron bombardment, exhibits a substantial variation in conductivity. In this particular structure, the semi-conductive material comprises a thin layer of glass similar to the glass used in the target structures of image orthicon or other pick-up and storage tubes; the conductivity of this material varies with modulation of an impinging electron stream in a manner somewhat similar to the BIC layer 118 of target structure 110 (Figure 5).

The target elements of group 134 are similar in construction; each comprises a layer 140 of green color filter material, a transparent conductive coating 141, and a layer of electroluminescent material 142. The target elements of group 145 each include a red color filter layer 143, a conductive coating 144, and an electroluminescent layer 145; because the lateral conductivity of semiconductive layer 139 is extremely low, this layer may be made common to all of the target element groups. Moreover, if a suitable electroluminescent material or mixture of materials which emits light corresponding to each of the three desired primary colors with approximately equal efficiency is employed in layers 138, 142, and 145, these portions of the target elements may be fabricated as a single continuous layer of electroluminescent material. A suitable process for depositing color filter layers 136, 140 and 143 upon substrate 25 is described and claimed in the copending application of Sam H. Kaplan, entitled "Color Image Reproducer and Method of Manufacture," Serial No. 532,723, filed September 6, 1955. The filter materials described in that application comprise colored glass frits and are well suited for use in high vacuum devices. The electron-gun side of image screen structure 130 is provided with an electron-permeable conductive coating 146, which is connected to a suitable regulated D. C. voltage source. Transparent conductive elements 137 are all electrically interconnected to form a single connector element which is coupled to a suitable source of color control signals; similarly, conductive coatings 141 are electrically interconnected and are coupled to the color control source, and conductive coatings 144 are all electrically interconnected and coupled to the source of color control signals.

In operation, target structure 130 is essentially similar to image screen structure 110 of Figure 5 and target 51 of Figure 3. Luminance values in the image to be reproduced are controlled by an electron stream which bombards the target structure from the direction generally indicated by arrow A. Color values in the image are controlled, as before, by signals applied to the individual connector elements associated with the color target groups.

In each of the various embodiments of the invention described above, color control may be effected on a sequential basis if desired. In a color television receiver, for example, the potentials on the individual electrical connectors associated with respective target element groups may be actuated sequentially to permit excitation of only one color group at any given instant. When this is done, modulation of the luminance control source (for example, electron gun 70 in Figure 3) may be effected by means of primary control signals of the form $E_R$, $E_B$, and $E_G$, these signals being applied to the luminance control source in the same sequence as the color switching signals applied to the target connector elements. On the other hand, in a sequential operation of this type, it is possible to develop a control signal which may be continuously applied to the electron gun; this type of operation is essentially similar to that proposed for use in conjunction with more conventional sequential-display color picture tubes and is described in the article "Processing of the NTSC Color Signal for One-Gun Sequential Color Displays" by B. D. Loughlin, "Proceedings of the IRE," January 1954, pages 299–308. The information and circuit set forth in that paper are directly applicable to color picture tubes utilizing target structures constructed in accordance with the invention when considered as sequential-display devices.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

We claim:

1. An image screen structure for a color image reproducer comprising: a first target element group comprising a multiplicity of individual target elements each comprising an electroluminescent material which effectively emits light of a first primary color when excited by an electrical field within a predetermined intensity range and a semiconductive material which varies in conductivity when subjected to corpuscular-energy bombardment; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; and electrical connector means for establishing separately controllable electrical fields across said two groups of target elements, said connector means including a pair of electrically conductive elements in contact with respective surfaces of said target element groups.

2. An image screen structure for a color image reproducer comprising: a first target element group comprising a multiplicity of individual target elements each comprising an electroluminescent material which effectively emits light of a first primary color when excited by an electrical field within a predetermined intensity range and a semiconductive material which varies in conductivity when subjected to corpuscular-energy bombardment; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; and electrical connector means for establishing separately controllable electrical fields across said two groups of target elements, said connector means including a pair of separate light-transparent electrically conductive coatings in contact with respective corresponding surfaces of said target element groups.

3. An image screen structure for a color image reproducer comprising: a first target element group comprising a multiplicity of individual target elements each comprising a discrete layer of an electroluminescent material which effectively emits light of a first primary color when excited by an electrical field within a predetermined intensity range and a discrete layer of a semiconductive material which varies in conductivity when subjected to corpuscular-energy bombardment, said two layers being in electrical contact with each other; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; and electrical connector means for establishing separately controllable electrical fields across said two groups of target elements, said connector means including a pair of electrically conductive elements in contact with respective corresponding surfaces of said target element groups.

4. An image screen structure for a color image reproducer comprising: a first target element group comprising a multiplicity of individual target elements each comprising a discrete layer of an electroluminescent material which emits light within a predetermined spectral range when excited by an electrical field within a predetermined intensity range, a discrete layer of a semiconductive material which varies in conductivity when subjected to corpusclar-energy bombardment, said two layers being in electrical contact with each other, and a color filter material which restricts light emitted from said target element to a first primary color; a second target element group comprising a multiplicity of individual target elements interspersed with said first group of target elements in a predetermined geometric pattern throughout an image screen area, each of said target elements of said second group being structurally similar to the target elements of said first group but comprising a filter material which restricts light emitted from said target elements to light of a second primary color; and electrical connector means for establishing separately controllable electrical fields across said two groups of target elements, said connector means including a pair of electrically conductive elements in contact with respective corresponding surfaces of said target element groups.

5. An image screen structure for a color image reproducer comprising: a first target element group comprising a multiplicity of individual target elements each comprising an electroluminescent material which effectively emits light of a first primary color when excited by an electrical field within a predetermined intensity range and a photoconductive material which varies in conductivity when subjected to bombardment by light; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; and electrical connector means for establishing separately controllable electrical fields across said two groups of target elements, said connector means including a pair of electrically conductive elements in contact with respective surfaces of said target element groups.

6. An image screen structure for a color image reproducer comprising: a first target element group comprising a multiplicity of individual target elements each comprising an electroluminescent material which effectively emits light of a first primary color when excited by an electrical field within a predetermined intensity range, a photoconductive material which varies in conductivity when subjected to bombardment by light, and a discrete layer of luminescent material which emits light when subjected to electron bombardment; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; and electrical connector means for establishing separately controllable electrical fields across said two groups of target elements, said connector means including a pair of electrically conductive elements in contact with respective surfaces of said target element groups.

7. An image screen structure for a color image reproducer comprising: a first target element group comprising a multiplicity of individual target elements each comprising a discrete layer of an electroluminescent material which effectively emits light of a first primary color when excited by an electrical field within a predetermined intensity range and a discrete layer of a photoconductive material which varies in conductivity when subjected to bombardment by a light, said two layers being electrically connected with each other by a layer of electrically conductive light-opaque material; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; and electrical connector means for establishing separately controllable electrical fields across said two groups of target elements, said connector means including a pair of electrically conductive elements in contact with respective surfaces of said target element groups.

8. An image screen structure for a color image reproducer comprising: a first target element group comprising a multiplicity of individual target elements each comprising an electroluminescent material which effectively emits light of a first primary color when excited by an electrical field within a predetermined intensity range and a semiconductive material which exhibits bombardment-induced conductivity variations in response to electron bombardment; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; and electrical connector means for establishing separately controllable electrical fields across said two groups of target elements, said connector means including a pair of electrically conductive elements in contact with respective surfaces of said target element groups.

9. An image screen structure for a color image reproducer comprising: a first target element group comprising a multiplicity of individual target elements each comprising an electroluminescent material which effectively emits light of a first primary color when excited by an electrical field within a predetermined intensity range and an electroconductive material which varies in conductivity when subjected to electron bombardment; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; and electrical connector means for establishing separately controllable electrical fields across said two groups of target elements, said connector means including a pair of electrically conductive elements in contact with respective surfaces of said target element groups.

10. A color television image reproducer comprising: a first target element group comprising a multiplicity of individual target elements each comprising an electroluminescent material which effectively emits light of a first primary color when excited by an electrical field within a predetermined intensity range and a semiconductive material which varies in conductivity when subject to corpuscular-energy bombardment; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; electrical connector means for establishing separately controllable electrical fields across said two groups of target elements, said connector means including a pair of electrically conductive elements in contact with respective surfaces of said target element groups; and means for subjecting said image screen area to corpuscular-energy bombardment to vary the excitation of said target elements in accordance with the luminance values of an image by modifying the conductivity of said semiconductive material.

11. A color television image reproducer comprising: a first target element group comprising a multiplicity of individual target elements each comprising an electroluminescent material which effectively emits light of a first primary color when excited by an electrical field within a predetermined intensity range and a semiconductive material which varies in conductivity when subjected to electron bombardment; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; electrical connector means for establishing separately controllable electrical fields across said two groups of target elements, said connector means including a pair of electrically conductive elements in contact with respective surfaces of said target element groups; and means comprising an electron gun for scanning said image screen area with a focused stream of electrons to vary the excitation of said target element groups in accordance with the luminance values of an image by modifying the conductivity of said semiconductive material.

12. A color television image reproducer comprising: a first target element group comprising a multiplicity of individual target elements each comprising an electroluminescent material which effectively emits light of a first primary color when excited by an electrical field within a predetermined intensity range and a photoconductive material which varies in conductivity when subjected to bombardment by light; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; electrical connector means for establishing separately controllable electrical fields across said two groups of target elements, said connector means including a pair of electrically conductive elements in contact with respective surfaces of said target element groups; and a light-projection device for illuminating said image screen area in accordance with the luminance values of an image.

13. A color television image reproducer comprising: a first target element group comprising a multiplicity of individual target elements each comprising an electroluminescent material which effectively emits light of a first primary color when excited by an electrical field within a predetermined intensity range and a photoconductive material which varies in conductivity when subjected to bombardment by light; a second target element group comprising a multiplicity of individual target elements interspersed with said first group of target elements in a predetermined geometric pattern throughout an image screen area, each of said target elements of said second group being structurally similar to the target elements of said first group but comprising an electroluminescent material, which, when excited, effectively emits light of a second primary color; electrical connector means for establishing separately controllable electrical fields across said two groups of target elements, said connector means including a pair of electrically conductive elements in contact with respective corresponding surfaces of said target element groups; a layer of luminescent material covering said image screen area on the surface of said target elements opposite said connector means; and electron gun means for scanning said layer of luminescent material to develop thereon a light image representative of luminance values in an image to be reproduced.

References Cited in the file of this patent

UNITED STATES PATENTS 2,728,815 Kalfaian _______________ Dec. 27, 1955
2,774,813 Livingston _______________ Dec. 18, 1956